United States Patent [19]
Bibby

[11] 3,854,336
[45] Dec. 17, 1974

[54] METHOD FOR DETECTING THERMAL CHANGES ON A SURFACE

[75] Inventor: Malcolm M. Bibby, Bath, Ohio

[73] Assignee: Monsanto Company, St. Louis, Mo.

[22] Filed: Jan. 26, 1972

[21] Appl. No.: 221,010

[52] U.S. Cl............... 73/351, 73/146, 73/355 R
[51] Int. Cl. .................................... G01k 3/06
[58] Field of Search............ 73/351, 146, 355 R; 250/83.3 H, 340

[56] References Cited
UNITED STATES PATENTS
| | | | |
|---|---|---|---|
| 3,101,618 | 8/1963 | Hance | 73/351 |
| 3,462,602 | 8/1969 | Apple | 73/351 |
| 3,463,007 | 8/1969 | Jones | 73/355 R |

OTHER PUBLICATIONS

Non–Dustrive Tire Analysis by Wolf; April 1970 in "Rubber Age" pages 58–64.

Primary Examiner—Richard C. Queisser
Assistant Examiner—Denis E. Corr

[57] ABSTRACT

A sensitive method for detecting minute changes in apparently repetitive infrared signals in which infrared signals from repeated surface scans are processed by subtracting the signals representative of a scanning interval from signals representative of a subsequent scanning interval and differences resulting from a series of such subtractions are summed.

18 Claims, 7 Drawing Figures

METHOD FOR DETECTING THERMAL CHANGES ON A SURFACE

This invention relates to methods and apparatus for detecting thermal changes on the surface of an object by infrared scanning. The invention is particularly applicable to the nondestructive testing of pneumatic tires.

BACKGROUND OF THE INVENTION

The usual method for detecting thermal changes on the surface of a rotating tire by infrared scanning is to focus an infrared detector (radiometer) on the tire surface so that successive portions of the tire surface are brought within the target area of the radiometer. Signals are generated proportional to temperature variation over the surface while subjecting the surface to repeated scans. The signals, after suitable amplification are fed to a visual display means and observed to detect any significant change at a point on the surface. The latter technique was adopted by George H. Halsey in a simplified infrared scanning system for detecting hot spots in pneumatic tires described by Wolf, *Rubber Age*, April, 1970, pages 58–64. An infrared sensor was focused on a tire as it revolved under load on a high speed test wheel and an oscilloscope provided a visual readout of the infrared signals proportional to temperature rise. The signals generated proportional to surface temperature variation may be indicative of the actual temperature at each target area of the scan in which case the base line is the zero point of the temperature scale but increased sensitivity is achieved by making the value of the base line approach the mean temperature of the expected variations. For example, the literature describing an industrial radiometer model indicated as applicable for infrared scanning of pneumatic tires advises that it provides a zero suppression circuit in series with the output leaving only the variations.

Unfortunately, visual inspection of a display of the signal output of a radiometer monitoring the surface of a rotating tire under load is insufficient to detect flaws at very early stages of their development. There are normal variations in infrared emission from the tire due to surface irregularities. For example, the brand name, size, serial number, and other indices on the surface cause the infrared emission to vary over different areas of the surfaces and it is necessary to distinguish these normal variations over different surface areas from changes in infrared emissions from the same surface area. The method for detecting flaws which depends upon the memory and eye of observer to detect any change among the characteristic peaks and valleys of normal infrared emissions is undependable in practice. The time varying signals from the radiometer associated with the condition of the tire intermingle undesired information of normal temperature variation due to surface irregularities, undesired information of normal temperature changes due to changing test conditions an the desired information of temperature changes associated with a flaw from which signals it is necessary to resolve the very small changes associated with a flaw. In fact, by the time a temperature increase associated with a flaw can be resolved, the test often has progressed to the point where the tire disintegrates before the test wheel can be stopped so that the location and nature of the defect cannot be determined. Moreover, the time varying signals from the radiometer are composed not only of signals associated with the condition of the tire (true signals) but also of random signals (noise) generated by the radiation detectors and associated electronics and by mechanical vibrations which cause defocusing of the detectors. The noise component increases the difficulty of interpreting the visual readout because a change in infrared signal detected at a particular point may well be the result of a noise component.

Heretofore, infrared emission during the warm-up period of a tire from time zero has obscured thermal changes resulting from a tire defect. For various reasons including the already mentioned indices on the surface of the tire which may protrude above the surface and cool it due to air turbulence and the characteristic dependence of the magnitude of the signals of infrared detectors on temperature, the tire will not assume a stable thermal pattern until after a warm-up period. Magnitude of the signals increases with temperature so that during the time the tire is warming to equilibrium temperature, the intensity of the signals per unit of temperature increases significantly. This phenomenon frustrates any attempt to observe a flaw during the initial warm-up period by comparing the infrared emission at a point on the surface with the emission at the same point at a previous time. Although the greatest change in test conditions usually occurs after a tire is first put on a test wheel and the test started, any significant change in test conditions, regardless of when they occur, tend to obscure observation of a flaw. Moreover there may be an actual change in thermal pattern over changing test conditions. Although the observations may be started after the tire first reaches equilibrium and started anew after each subsequent change, a means of detecting a flaw by continuously monitoring the surface during the entire range of test conditions is much to be desired.

SUMMARY OF THE INVENTION

According to the present invention an improvement in detecting thermal changes on a surface of an object by infrared scanning in which signals are generated proportional to surface temperature variation and the surface is subjected to repeated scans is achieved by subtracting signals representative of a scanning interval from signals representative of a subsequent scanning interval over the same surface area. Preferably, the subtractions are made between a series of scanning intervals and the resulting differences are summed. Accumulating the measured differences provides an efficient method for monitoring a surface of an article during subjection to test conditions designed to indicate internal flaws by changes in infrared emission from the surface. The principle may be applied in an almost infinite variety of forms, the one most desirable depending upon the particular conditions under which the surface is to be monitored and in extreme cases where the surface is monitored over a very wide range of temperatures, it may be desirable to vary the method of treating the differences during a single test. The differences may be weighted as desired. In some instances, it may be preferred to accumulate half or some other fraction of the differences. Assuming a series of four scanning intervals and assigning to the infrared emissions from the same surface area the values of $a$, $b$, $c$ and $d$, respectively, for each scan, it is evident that accumulating the differences $(b-a) + (c-b) + (d-c)$ simply provides the value of $(d-a)$. A more desirable arrangement is to employ $a$ as the reference value for each subtraction and accumulate $(b-a) + (c-a) + (d-a)$. Alternatively, the reference value is updated continually or intermittently, for example, by substituting for $a$ in $c-a$ the average of $a + b$ and by substituting for $a$ in $d-a$ the average of $a + b + c$. Throughout the duration of the test, it is feasible to modify the reference value for each subtraction by application of automatic averaging as described in Schillinger U.S. Pat. No. 3,478,328 to obtain as the new reference value to be subtracted from the value of the current scanning interval the average value of all previous scanning intervals. However, it is much preferred to modify the reference value more slowly. The manner in which the reference value changes is empirically derived for different testing procedures and will depend upon whether a high stress test or low stress test is involved, stress being a function of the speed and loading. It will also depend upon the type of tire, for example, whether truck, passenger or airplane.

Each scanning interval may be a single scan which in the case of a rotating tire would be the time for the radiometer to view once a band of target width around the entire circumference of the tire but preferably, the scanning interval includes a plurality of scans and the signals are averaged over the interval, the average being the value used in the subtraction step. The signal generated may directly indicate surface temperature or may indicate the difference between surface temperature and temperature of a reference body. Both types of signals are used in infrared scanning to provide signals proportional to surface temperature variation and are applicable to the present invention.

A simple but effective system for the nondestructive testing of a rotating tire under load, whereby changes in infrared emissions from the same target area upon succeeding revolutions of the tire and their location are detectable, comprises means for sensing the beginning of each revolution of the tire or attached axle, means for sensing a plurality of segments of the tire, means for detecting infrared emission, means for generating signals proportional to surface temperature variations, means for maintaining the output level of the infrared detectors substantially constant, means for obtaining difference between infrared signals representative of a scanning interval and infrared signals representative of a subsequent scanning interval over the same surface area and means for accumulating the differences and, if desired, means for displaying them. Further features comprise means for averaging signals over a scanning interval and means for moving the infrared detecting means over the surface of the tire.

Summing differences after successive scans improves the quality of the signals by minimizing the effect of the noise signal and intensifying the changes in signal associated with flaw development. By sampling a time varying input signal, I, at two different times $t$ and $t'$ where $t'$ is a reference time, $t$ being greater than $t'$, and subtracting, a difference signal, D, is obtained where $D = I_t - I_{t'}$. Because the time varying input signal is composed of a true signal, S, and a noise signal, N, where $I = S + N$, the relation of the components to D is $$D = (S_t - S_{t'}) + (N_t - N_{t'})$$

That summing differences from successive scans reduces noise but leaves the true signal contribution unaffected follows from the fact that averaging signals from successive scans reduces the noise effect. Thus, summing $I = S_t + N_t$ over n scans gives $$\sum_1^n I = nS_t + \sum_1^n N_t.$$

Averaging then gives $$1/n \sum_1^n = S_t + 1/n \sum_1^n N_t$$

Because the noise component is noncoherent, the last term decreases as n increases, thereby increasing the signal to noise ratio. In scans $a$, $b$, $c$ and $d$ the summing $(b-a) + (c-a) + (d-a)$ is in effect an averaging process which reduces the noise contribution.

A further improvement of the invention which makes possible meaningful observations during changing test conditions, for example, as the tire temperature increases at the beginning of the test, is achieved by making the output of the radiometer substantially constant. Increase in the intensity of the infrared signal per unit of temperature as temperature rises is minimized by making the output of the radiometer substantially independent of the magnitude of the input signal without significantly diminishing ability to sense temperature change generated by development of a flaw by application of automatic gain control, for example, as used in radio and various audio applications where it is desired to maintain the output level of the signals essentially constant regardless of level of input signals.

A portion of the amplifier output is processed to obtain a control signal, preferably proportional to the root-mean-square (rms) value of the output signal. This control signal in turn is used in conjunction with a variable gain element to adjust the overall amplification of the radiometer electronics so that the magnitude of the rms value of the output signal waveform remains substantially constant for a wide range of input signal levels. It should be noted that this control signal may be proportional to quantities other than the rms value of the output signal, for example, the average or peak-to-peak value. However, selecting the peak-to-peak value of the output signal waveform as the value to be maintained substantially constant is less desirable. Selecting the rms value minimizes the effect on the control signal of changes in infrared emission at the early stages of flaw development. The rms value is derived by considering all data points comprising the signal and a flaw development will have minimal effect on the control signal, whereas a control signal using a peak-to-peak value would be misleading when a flaw developed at the same location as the peak value of the signal because the amplification would then be controlled by the flaw directly and the indication of flaw development effectively suppressed. Automatic gain control in any of the aforesaid embodiments is a well-known technique and its application to infrared signals requires only the adoption of well-known circuitry.

In one important embodiment of the invention, it supplements regular wheel testing by converting it to a nondestructive test which precisely locates flaws after which the test can be automatically terminated before the tire destroys itself. The invention not only makes the complete tire available for inspection but allows a new tire to be rigged for inspection sooner, thereby saving wheel time. Flaws generated in the tire by test wheel conditions due to structural weaknesses can be detected as well as flaws initially present. It will be appreciated that a tire may successfully pass a standard test on a test wheel yet a flaw may have been generated rendering the tire unsafe for service. The invention detects such structural weaknesses not otherwise observable. Of course, the invention also provides assurance that a flaw is absent.

In the various embodiments of the invention the complexities of normal thermal variations are minimized by taking differences so that the infrared display appears essentially as a straight line except for thermal changes detected and sensitivity is improved by summing.

DESCRIPTION OF PREFERRED EMBODIMENTS

Figure 1:
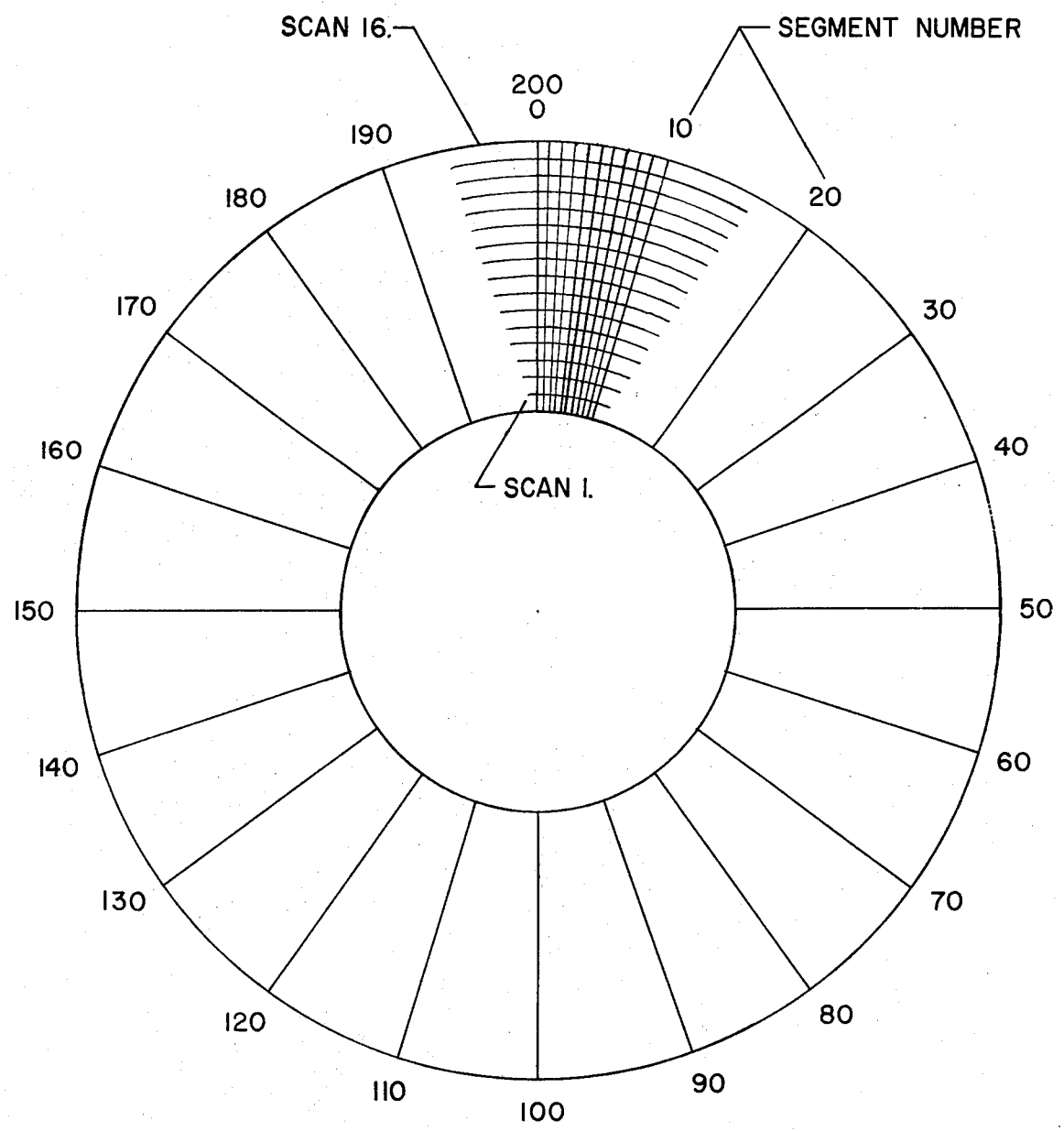
FIG. 1 is a tire legend utilizable for location purposes.
Figure 3:
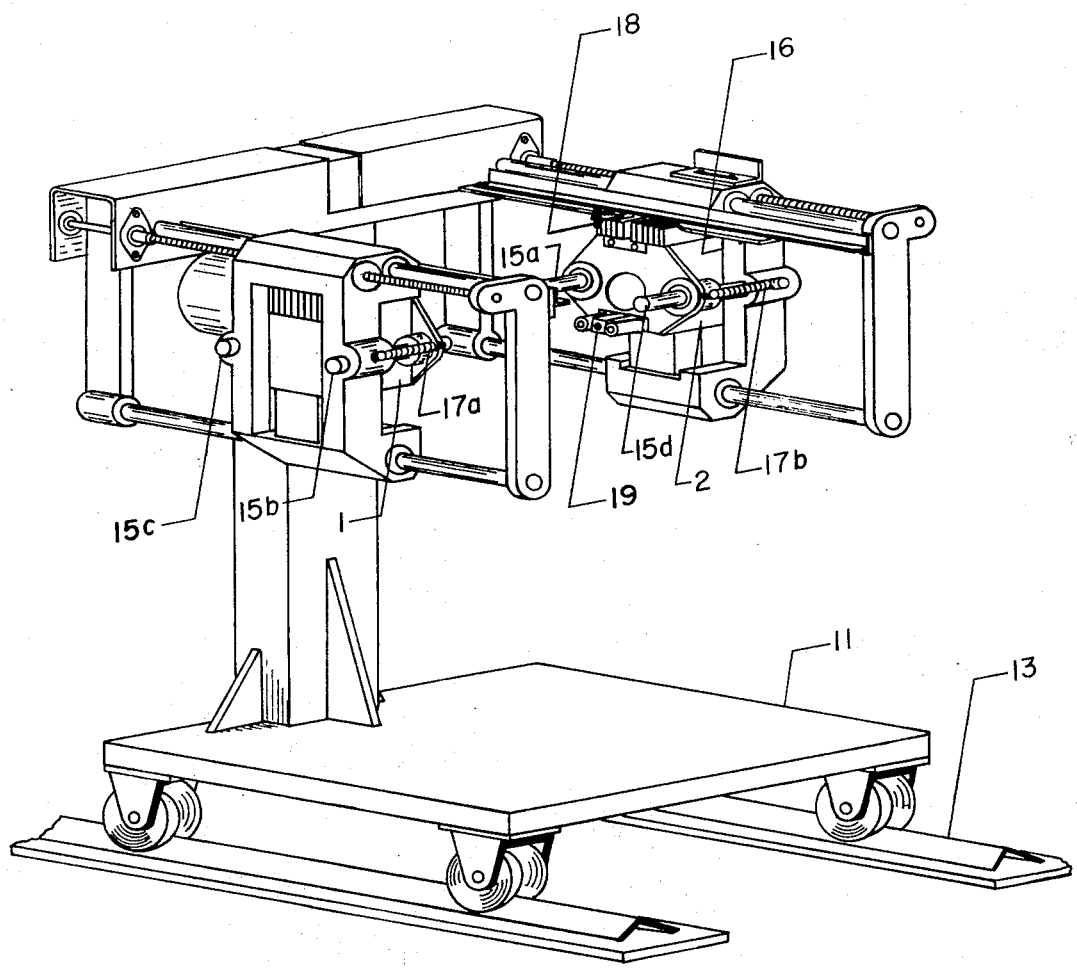
FIG. 3 is a perspective view of the scanning mechanism dismounted and without the test wheel.

As best seen in FIG. 3, two radiometers, 1 and 2, are mounted on a scanning assembly to scan both sides of a tire. Suitable means are provided to control the position of the radiometers to sense the beginning of each revolution and to identify the positions on the tire surface which correspond to the infrared signals. Referring to FIG. 1 showing the legend used for identification purposes, infrared data are sampled 200 times per tire revolution and the tire is viewed as 16 adjacent concentric bands from bead to tread. Suitable means are provided for sensing the beginning of each revolution which beginning serves as a reference point for correlating the thermal data with a tire segment and for locating the segment in which a flaw appears. A variety of means for sensing the beginning of each revolution are available. The preferred method is to employ a proximity sensor or, if desired, an optical encoder mounted on the axle which supports the tire. The device generates a pulse every revolution of the tire which pulse is fed to the data processor along with the infrared data.

Another proximity sensor or, if desired, an optical encoder provides timing signals to initiate sampling of infrared data. The sampling frequency will depend upon the size of the tire. The maximum circumference of the tire divided by width of the radiometer viewing area provides as the quotient the minimum number of sample points required. A somewhat higher sample frequency with overlapping of the target areas to assure complete coverage of the tire circumference is preferable. In a tire of 100 in. maximum circumference scanned with a radiometer of ½ × ½ in. target area, a minimum of 200 points per revolution should be sampled and stored in data processing.

Figure 2:
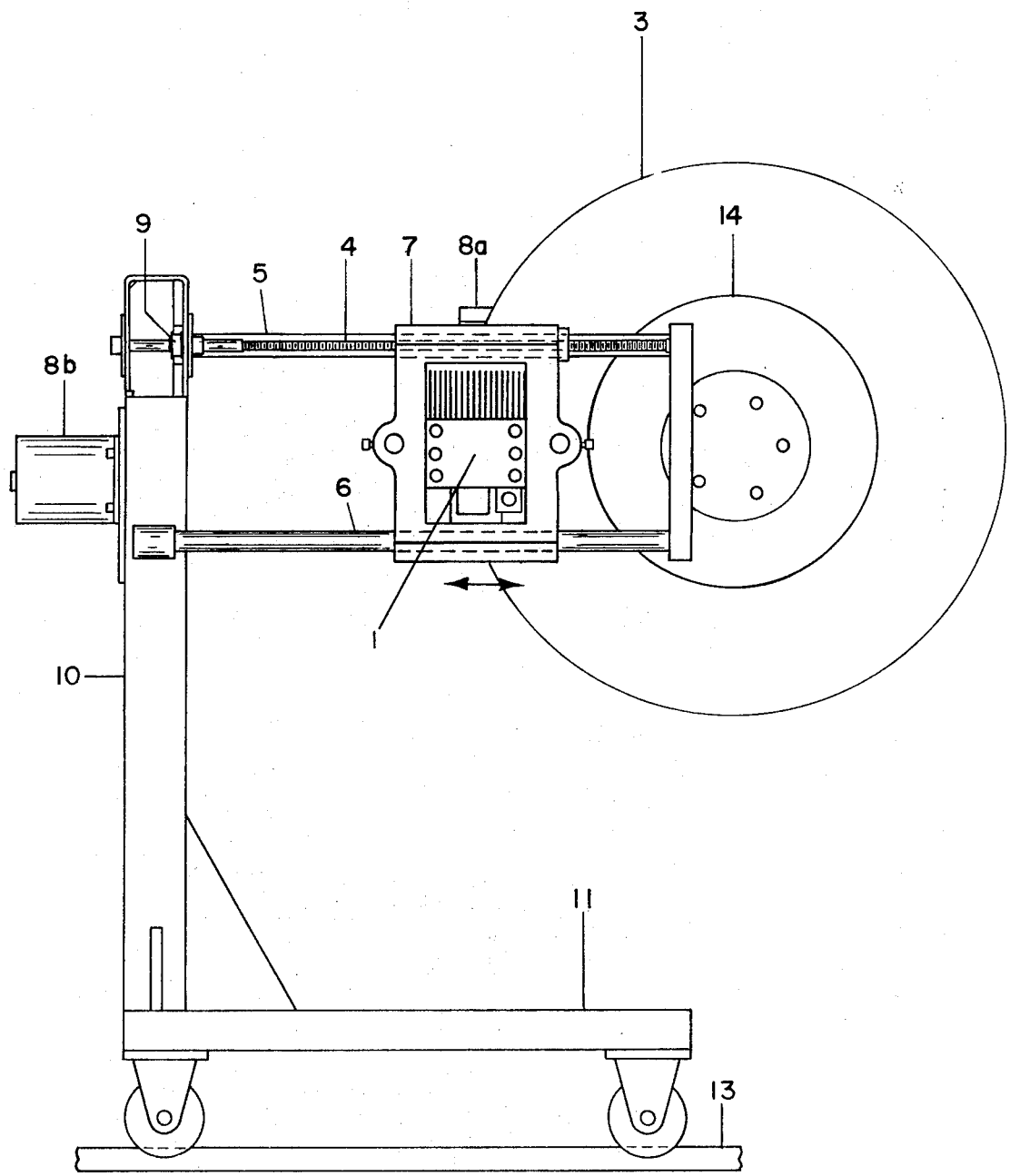
FIG. 2 is an elevation view showing an infrared radiometer mounted on a test wheel and illustrates the relationship of the radiometer, scanning mechanism and test wheel.

Referring to FIG. 2, radiometer 1 is mounted in front of test tire 3 and the second radiometer, not visible, is mounted at the rear of tire. The scan or band number is determined by the position of the radiometer fixed by threaded rod 4. Support rods 5 and 6 which pass through a supporting housing 7 for the radiometer on which the radiometer housing is free to slide under control of the threaded rod, permits the scan to be shifted from one position to another. Outer edge of the rim is indicated by a switch, not shown, attached to the test wheel frame which switch is activated by plate 8. Position of the radiometer on supporting rods 5 and 6 controlled by threaded rod 4 is automatically varied to encompass the 16 scanning positions by stepping motor 8 which, from a central drive pulley, drives two belts one to each radiometer, one of which is indicated as 9. Belt 9 drives aforesaid threaded rod 4 to cover automatically the 16 scanning points illustrated in FIG. 1. The assembly is mounted on support housing 10 fixed to truck 11 movable on track 13.

After the edge of the rim 14 is located, the tread position is located with an optical system 19 (FIG. 3) mounted in the radiometer. When the radiometers view each other over the tire tread, thereby locating tread position, a number proportioned to the tire dimension is determined from the number of pulses required to drive the stepping motor during movement of the radiometer from rim to tread position. The number is divided by 16 so that each scanning position is a distance away from the rim edge proportional to an integral multiple of the above derived quotient. The complete tire is scanned, depending on tire speed, in approximately one-half inch bands with a dwell of four revolutions per band.

The radiometers are also movable in a direction parallel to the axis of the test wheel on which the tire is mounted so as to follow the tire contour to obtain optimum resolution. As best seen in FIG. 3, the radiometers 1 and 2 are movable within the housings by sliding on supporting rods 15a, 15b, 15c, and 15d. Cams, one of which is illustrated as 16, simulate the contour of the tire and the radiometers are forced to follow the tire contour by springs, 17a and 17b, which hold the radiometers under spring tension so that the cam followers, one of which is shown as 18, are maintained in contact with the cam as the radiometers move through their various scanning bands from bead to tread.

The radiometer which converts thermal flux into a representative analog voltage comprises a highly sensitive infrared detecting element with a fast response time, for example, indium antimonide. An elliptical mirror is used to focus the surface of the tire onto the detector. Other reflecting and/or refracting systems could be employed. A low noise preamplifier is preferably incorporated to obtain the best possible signal/noise ratio. The amplified voltage available from the preamplifier is presented to a signal processor comprising a band-pass filter and a buffer amplifier. The aforesaid are designed so that only thermal gradients above a certain value are amplified. Thus, a slowly rising and falling temperature gradient will be attenuated whereas an area of rapidly changing thermal variations will be amplified. The upper cutoff frequency is designed to allow resolution of the fastest rise-time encountered in a revolution of the tire in order to optimize the signal/noise ratio. The higher the speed of rotation, the higher the cutoff frequency required. For example, for a target area of one-fourth square inch at a 45 mile per hour surface velocity, an upper frequency limit of 2 Khz. is needed. At 90 miles per hour an upper frequency limit of 4 Khz. is required. The lower cutoff frequency determines the slowest rise-time that will be passed by the filter. This is determined by the slowest test speed and the lowest significant thermal gradient. This frequency is typically 10 to 20 Hz. Obviously, when the tire is not rotating, no output is obtained.

Figure 4:
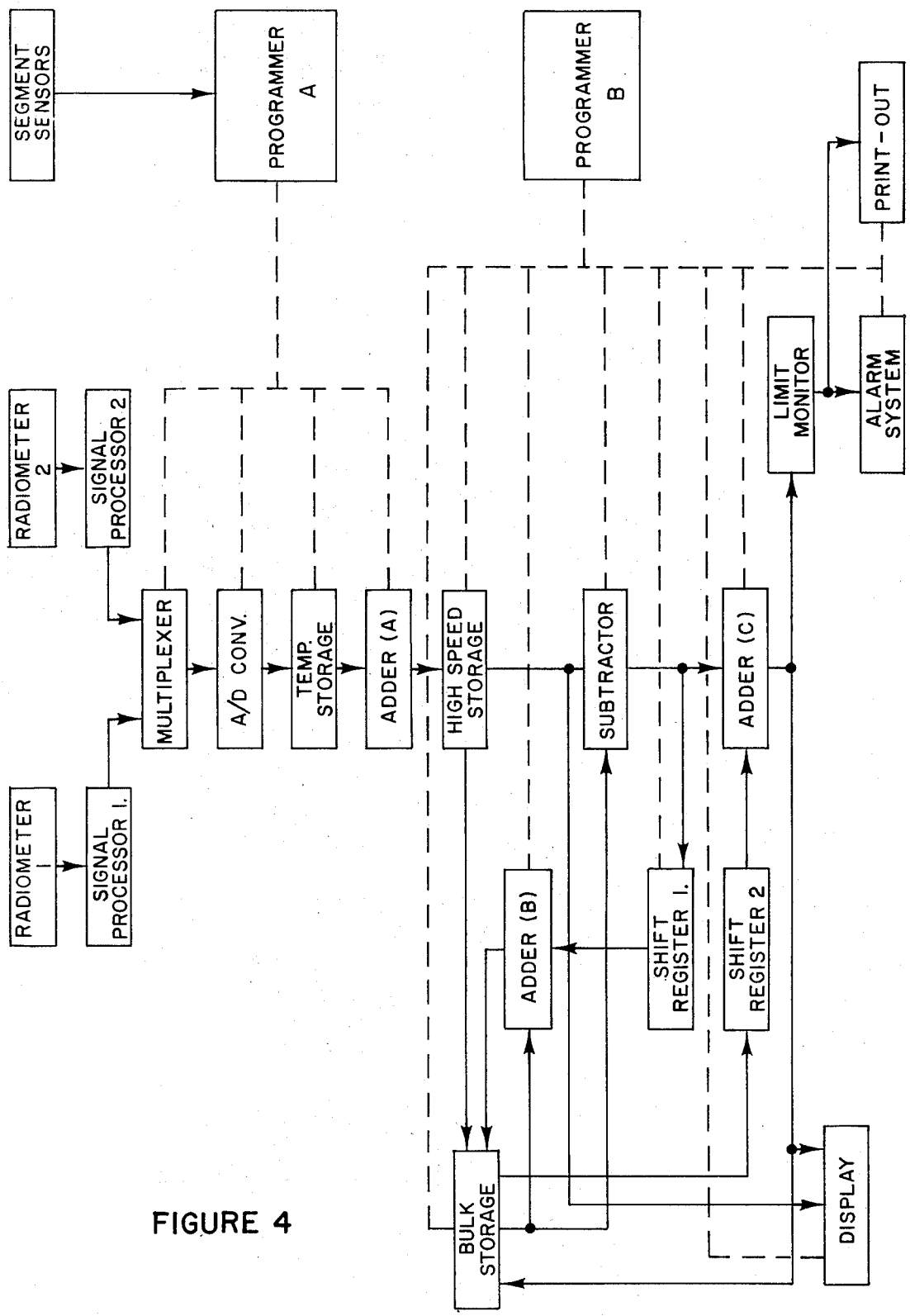
FIG. 4 is a schematic representation of apparatus employed to subtract the signals representative of a scanning interval from signals representative of a subsequent scanning interval.

The operation of the system with respect to acquisition, processing, interpretation, display and recording of data, and printout of critical values will now be described employing scanning intervals which comprise multiple scans by two radiometers. Referring to FIG. 4, infrared emission from the surface of a tire rotating under load are detected by radiometers 1 and 2. The signals from each radiometer comprise signals proportional to the thermal variations on a band around the tire. The signals are passed to signal processors where the gain is adjusted to maintain a constant rms output signal level. The signals are then fed to a multiplexer and thence the signals from each radiometer are fed one at a time to analog to digital converter. The digital signals are temporarily stored in temporary storage area and in conjunction with adder A are processed under control of programmer A to obtain the average value of the signals for the current scanning interval. The programmer operates in accordance with information supplied by segment sensors.

All subsequent operations are under control of programmer B which operates as follows: The digital signals for the first scanning interval comprising the aforesaid averages are temporarily retained in high speed storage and also fed to bulk storage. The average values of the scans over the first scanning interval constitute the initial reference data for the scanning interval. On second and subsequent scanning intervals the average values again are stored in high speed storage. The reference data are subtracted from said average value in the subtractor. The same reference data may be used throughout the duration of the test but preferably is subject to modification for each subtraction. Because of slow changes in tire surface temperature it is preferred to modify the reference data slowly using the general relationship $$A_n = A_{n-1} + (1/m) (I_n - A_{n-1})$$

in which $A_n$ is the reference value to be substracted from the value of the $n+1$ scanning interval, n being the number of the current scanning interval, $A_{n-1}$ is the reference value of the current scanning interval, $m$ is a weighting factor and $I_n$ is the value of the current scanning interval. In the initial stages of the test, $m$ is usually small so that the reference data will be modified to a greater degree than later in the test when the rate at which the tire surface temperature increases is much smaller and m can be made much larger. The shift register divides $I_n - A_{n-1}$ by m and the quotient is added to $A_{n-1}$ in adder B, the sum replacing the previous reference value in bulk storage.

Often division by m is accomplished using digital circuitry. Then it is convenient to round off $m$ to the nearest integral power of 2. In a preferred embodiment, $m$ is a variable, the value of which is given by the relationship $$2^r < n < 2^{r+1}$$

where $m = 2^{r+1}$. Thus, the signals subtracted representative of a scanning interval are values of a reference scanning interval subject to modification by the averaged values of each subsequent interval according to the aforesaid weighting factor.

The differences are summed according to another weighting factor which may be 1 but is normally less than 1, preferably one-half or some other inverse of a power of 2. The application of this weighting factor to the accumulated differences, under control of programmer B, is accomplished by shift register 2. A weighting factor less than 1, like automatic gain control, improves resolution of signals associated with flaw development over changing test conditions. The usefulness of increased sensitivity achieved by accumulating differences is limited by the need to distinguish changes in the signals associated with a flaw from normal changes which sometimes occurs during alteration of test conditions. The thermal pattern may, in fact, change over an increase in temperature of the tire so that over the time of increase, differences accumulate but resort to a weighting factor less than one, improves ability to distinguish from accumulated differences due to flaw development which, of course, continue to accumulate after a new temperature equilibrium is reached.

The aforesaid difference is also fed to adder C where it is added to the sum of previous differences. Of course, when the first difference goes to adder C no preceding difference will have been accumulated and the quantity added will be zero. The sum will be retained in bulk storage until the cycle is repeated and will be added to the next difference which appears in adder C and the new sum will replace the prior accumulated difference in bulk storage. The quantity appearing at the output of adder C is shown in the display unit which is a cathode ray tube display along with other information as may be desired. The limit monitor is used to compare accumulated difference to predetermined limits, said limits being indicative of tire flaw development. When this value is reached, an alarm system is activated and it is possible to shut down the test wheel automatically whereupon the flaw location is automatically printed out by the indicated printout unit.

A set of five tires is built in duplicate. One set is subjected to infrared scanning of the shoulder area during standard high speed tests in conjunction with means for analysis of temperature changes according to the present invention. The analysis means enable the tests to be stopped just after failure initiation but before catastrophic collapse and to fix the precise location of failure initiation. The tires, all polyester cord carcass with reinforced belts, are sectioned through these locations and the nature of the initiatory flaws observed. In the table below the point at which the test is discontinued refers to the duration of Department of Transportation Test Procedure 109. In said test the tire is run under load for 30 minutes at 75 miles per hour, then 30 minutes at 80 mph followed by running for 30 minute intervals at speeds 5 mph higher than the speed of the previous 30 minute interval until the tire fails.

| Tire | Point at which test is discontinued | Position No. of flaw | Nature of Flaw |
|---|---|---|---|
| 1 | 2 min. at 95 mph | 115 | Separation of belt plies and belt; skin coming off polyester cord |
| 2 | 24 min. at 100 mph | 40 | Same |
| 3 | 5 min. at 105 mph | 16 | Same |
|   |   | 21 | Same |
|   |   | 111 | Same |
| 4 | 15 min. at 100 mph | 52 | Shoulder separation top of second belt. |
| 5 | 4 min. at 105 mph | 0 | Incipient shoulder separation between belts. |
|   |   | 72 | Shoulder separation between belts and at top or at the top of the belts extending from crown to shoulder past belt edges. |

The duplicate set of tires is subjected to the same test without infrared analysis. In terms of severities required to cause failure, the results are in agreement with the aforesaid results in terms of severities required to initiate failure but after running to failure, it is impossible to determine the nature of the flaw causing failure due to the destruction of the tires.

Figure 5:
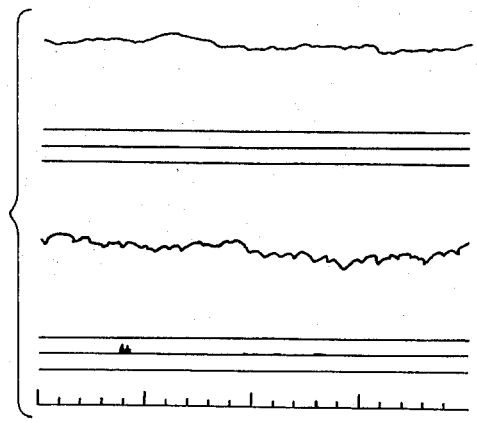
FIGS. 5, 5A and 5B illustrate the displays at three different times from radiometers focused on the shoulder of a tire rotating under load on a test wheel.
Figure 5A:
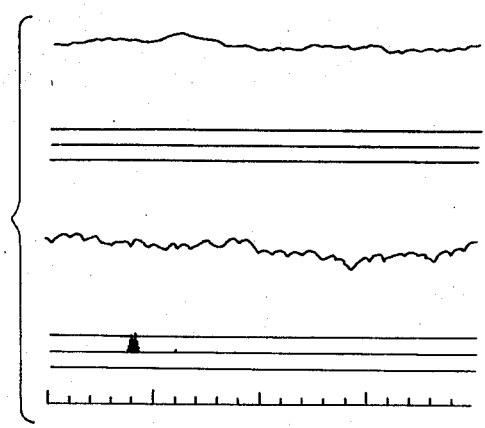
Figure 5B:
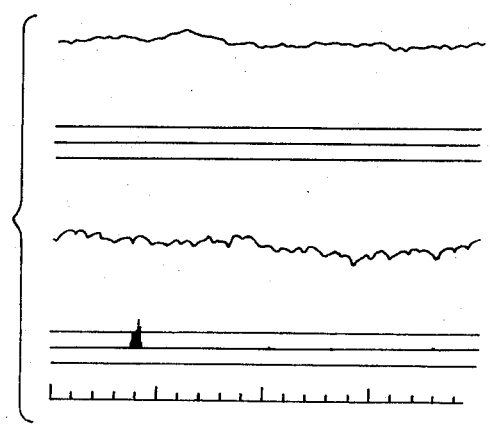

FIGS. 5, 5A and 5B are reproductions of the visual display of tire No. 2 at three different times. FIG. 5 is the display early in the test, FIG. 5A is the display at a later period and FIG. 5B is the display still later when specification limits have been exceeded. It will be appreciated that the automatic cutoff is inactivated for these tests in order to continue the observation of flaw development. The upper curves are the values of the current scanning interval and clearly show the thermal variations over the surface. The accumulated differences appear on the middle of the sets of three lines, the upper and lower lines representing the upper and lower specification limits for the cumulative difference curve. Each of FIGS. 5, 5A and 5B show the displays for the front and rear of the tire, the upper sets of curves being for the rear and the lower set for the front. At the time of the display of FIG. 5A, the specification limits at a point on the front of the tire have just been reached. The location of the point is indicated by an index display. The bottom display is an index marking the circumference of the tire into 20 equal portions of 10 parts each to which the displays above the index correspond. The curves representing the current scanning data show, of course, the unprocessed data and are typical of the displays obtained by infrared scanning methods heretofore known. Comparing the unprocessed data curves for the three different times, it is evident that no flaw can be detected. However, the first cumulative difference curve of FIG. 5 shows incipient flaw development in the front of the tire, which flaw develops progressively as shown by the later displays of cumulative differences. As noted above, examination of the tire confirmed the presence of the indicated flaw.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. In a method for detecting by infrared scanning thermal changes on a surface of a pneumatic object subject to imposition of load and the generation of heat when in service wherein the object is heated, signals are generated proportional to surface temperature variation and the surface is subjected to repeated scans, the improvement which comprises generating reference values of signals representative of a scanning interval over a surface of the object, subtracting said reference values from values of signals representative of a subsequent scanning interval over the same surface area, making the subtractions between a series of scanning intervals and summing the resulting differences.

2. Method of claim 1 in which the magnitude of the signals proportional to surface temperature variation over a scanning interval is maintained at substantially constant value.

3. The process of claim 1 in which each scanning interval is a plurality of scans and the values of said generated signals are averaged over the interval.

4. The process of claim 1 in which each scanning interval is a plurality of scans, the values of said generated signals are averaged over the interval, the values of signals subtracted representative of a scanning interval are values of a reference scanning interval subject to modification by the averaged values of each subsequent scanning interval according to a weighting factor and the differences are summed according to a second weighting factor.

5. The process of claim 4 in which the object scanned is a pneumatic tire and the rms value of the output signal waveform is maintained substantially constant.

6. The process of claim 1 in which the object scanned is a pneumatic tire being tested by rotation under load on a test wheel, the signals generated proportional to surface temperature variation are analog voltage signals representative of surface temperature variation on the tire surface the magnitude of which is maintained at substantially constant value, the beginning of each revolution of the tire is determined and sampling of the voltage signals is initiated at predetermined frequency whereby the voltage signals are identified with particular areas of the tire surface, the analog voltage signals are converted to digital signals, the values of the digital signals are averaged over a scanning interval of a plurality of scans, the averaged digital values are converted to reference values for subtraction from averaged digital values of a subsequent scanning interval according to the relationship $$A_n = A_{n-1} + 1/m \, (I_n - A_{n-1})$$

the subtractions are made between said reference values and the averaged digital values of a scanning interval subsequent to the interval represented by the reference data, summing of the resulting differences is done according to a weighting factor which is the inverse of a powder of 2 and, both the averaged values of the digital signals of said subsequent scanning interval and the sum of previous differences with respect to the segments of the tire are displayed.

7. Apparatus for detecting by infrared scanning thermal changes on a surface of a pneumatic object subject to imposition of load and the generation of heat when in service comprising
  a. means for heating the object,
  b. means for detecting infrared emission,
  c. means for generating signals proportional to surface temperature variation coupled to said means for detecting infrared emission,
  d. averaging means for averaging said signals proportional to surface temperature variation over a scanning interval comprising a plurality of scans to produce reference values of signals representative of a scanning interval,
  e. first storage means for storing said reference values of signals representative of a scanning interval,
  f. second storage means operatively connected to said first storage means for storing subsequent values of signals proportional to surface temperature variation representative of a subsequent scanning interval over the same surface area, and
  g. subtraction means operatively connected to said first and second storage means for obtaining difference in values between said reference values and said subsequent values.

8. Apparatus of claim 7 which includes means for maintaining the magnitude of the signals proportional to surface temperature variation over a scanning interval at substantially constant value.

9. Apparatus of claim 7 which includes means for summing successive differences between the average values of succeeding scanning intervals and the value of a reference scanning interval.

10. Apparatus of claim 9 which includes means for displaying the average signals of the current scanning interval and means for displaying the accumulated differences.

11. Apparatus of claim 7 for scanning a pneumatic tire which includes means for moving the infrared detecting means over the surface of a tire being tested by rotation under load to select the position corresponding to the desired scan number, means for sensing the beginning of each revolution and means for sensing a plurality of segments of the tire.

12. Apparatus of claim 11 which includes means for detecting when the signals exceed a predetermined limit and means for automatically terminating the test when the predetermined limit is exceeded.

13. Apparatus of claim 9 for scanning a pneumatic tire which includes means for moving the infrared detecting means over the surface of a tire being tested by rotation under load to select the position corresponding to the desired scan band number on the tire, means for sensing the beginning of each revolution of the tire and means for sensing a plurality of segments of the tire with reference to the beginning of each revolution.

14. Apparatus of claim 13 which includes means for detecting when the signals exceed a predetermined limit and means for automatically terminating the test when the predetermined limit is exceeded.

15. Apparatus of claim 13 which includes means for printing out the location on the surface at which the predetermined limit is exceeded.

16. Apparatus of claim 14 which includes means for printing out the location on the surface at which the predetermined limit is exceeded.

17. Apparatus of claim 7 for scanning a pneumatic tire which includes means for maintaining the magnitude of the signals proportional to surface temperature variation over a scanning interval at substantially constant value, means for averaging the values of signals over a scanning interval comprising a plurality of scans, means for summing differences between the average value of succeeding scanning intervals and the value of a reference scan, means for moving the infrared detecting means over the surface of a tire being tested by rotation under load to select the position corresponding to the desired scan band number, means for sensing the beginning of each revolution, means for sensing a plurality of segments of the tire with respect to the beginning of each revolution, means for displaying the average value of signals of the current scanning interval, means for displaying the accumulated differences, means for detecting when a value of the signals exceeds a predetermined limit and means for automatically terminating the test when the predetermined limit is exceeded.

18. Apparatus for detecting thermal changes on the surface of a tire being tested by rotation under load on a test wheel which comprises two radiometers for converting thermal flux to analog voltage signals representative of surface temperature variations, mountable to scan both sides of the tire, means for moving the radiometers for viewing adjacent concentric bands from bead to tread, means for moving the radiometers parallel to the axis of the test wheel on which the tire is mounted for following the contours of the tire, means for sensing the beginning of each revolution of the tire, means to initiate sampling of said voltage signals at predetermined frequency so as to correlate the signals with particular segments of the tire, means for maintaining the magnitude of the analog voltage signals from each radiometer at substantially constant value, means for converting said analog voltage signals to digital signals, means for averaging the values of said digital signals over a scanning interval of a plurality of scans, means for storing the averaged digital values, means for converting said averaged digital values to reference values for subtraction from averaged digital values of a subsequent scanning interval according to the relationship $$A_n = A_{n-1} + 1/m \, (I_n - A_{n-1})$$

means for storing the reference values, means for obtaining differences between said reference values and the averaged digital values of a scanning interval subsequent with respect to the interval represented by the reference data, means for summing said differences according to a weighting factor which is the inverse of a power of 2, means for displaying both the averaged values of the digital signals of the subsequent scanning interval and the sum of previous differences with respect to segments of the tire, means for detecting when a value of said sum of differences exceeds a predetermined limit, means for automatically terminating the test when the predetermined limit is exceeded and means for printing out the location on the tire surface at which the predetermined limit is exceeded.

* * * * *